US012358218B2

(12) United States Patent
Lenzen et al.

(10) Patent No.: US 12,358,218 B2
(45) Date of Patent: Jul. 15, 2025

(54) 3D PRINTER FOR ADDITIVE MANUFACTURING OF A COMPONENT AND PRINTING METHOD

(71) Applicant: TDK Electronics AG, Munich (DE)

(72) Inventors: Thomas Lenzen, Graz (AT); Reinhard Neureiter, Munich (DE); Christoph Recher, Frauental (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 18/625,468

(22) Filed: Apr. 3, 2024

(65) Prior Publication Data
US 2024/0262035 A1 Aug. 8, 2024

Related U.S. Application Data

(62) Division of application No. 17/761,884, filed as application No. PCT/EP2021/051342 on Jan. 21, 2021, now Pat. No. 12,005,639.

(30) Foreign Application Priority Data

Jan. 29, 2020 (AT) .............................. A 50014/2020

(51) Int. Cl.
*B29C 64/357* (2017.01)
*B29C 64/165* (2017.01)
(Continued)

(52) U.S. Cl.
CPC .......... *B29C 64/165* (2017.08); *B29C 64/205* (2017.08); *B29C 64/232* (2017.08);
(Continued)

(58) Field of Classification Search
CPC ................................................... B29C 64/357
See application file for complete search history.

(56) References Cited

U.S. PATENT DOCUMENTS 2,720,479 A 10/1955 Crawford
2002/0090410 A1 7/2002 Tochimoto
(Continued)

FOREIGN PATENT DOCUMENTS

CN 105383059 A 3/2016
JP S63312130 A 12/1988
(Continued)

OTHER PUBLICATIONS

International Search Report and Written Opinion of International Searching Authority corresponding to International Patent Application No. PCT/EP2021/051342, with English translation of the Search Report, mailed May 20, 2021 (15 pages).

(Continued)

*Primary Examiner* — Timothy Kennedy
(74) *Attorney, Agent, or Firm* — Nixon Peabody LLP

(57) ABSTRACT

A 3D printer for additively manufacturing a multilayer component. The 3D printer includes at least two separate dispensers coating a conveyor belt with respectively different raw material, a manufacturing unit in which at least part of the raw material is added to the component as a new layer, at least two separate recovery devices for selectively recovering the respectively different raw material, which is not consumed when a layer is added to the component, and for returning the raw material to the respective associated dispenser, and conveyor belt that transports the raw material from the dispenser to the manufacturing unit and further to the recovery device in the lateral direction.

13 Claims, 3 Drawing Sheets

(51) Int. Cl.
  *B29C 64/205*    (2017.01)
  *B29C 64/232*    (2017.01)
  *B29C 64/236*    (2017.01)
  *B29C 64/245*    (2017.01)
  *B29C 64/264*    (2017.01)
  *B29C 64/35*     (2017.01)
  *B33Y 10/00*     (2015.01)
  *B33Y 30/00*     (2015.01)
  *B33Y 40/00*     (2020.01)

(52) U.S. Cl.
  CPC .......... *B29C 64/236* (2017.08); *B29C 64/245* (2017.08); *B29C 64/264* (2017.08); *B29C 64/35* (2017.08); *B29C 64/357* (2017.08); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 2013/0052291 A1 | 2/2013 | Morikawa |
| 2017/0182708 A1 | 6/2017 | Lin |
| 2018/0043619 A1 | 2/2018 | Hyoungseok |
| 2018/0264731 A1 | 9/2018 | Kritchman |
| 2018/0272608 A1 | 9/2018 | Suk |
| 2020/0198231 A1 | 6/2020 | Dubelman |
| 2020/0254691 A1 | 8/2020 | Mamrak |

FOREIGN PATENT DOCUMENTS

| | | |
|---|---|---|
| JP | H0872153 A | 3/1996 |
| JP | 2000158544 A | 6/2000 |
| JP | 2016074178 A | 5/2016 |
| JP | 2020116943 A | 8/2020 |
| WO | WO 2015/107066 A1 | 7/2015 |
| WO | WO 2017/009368 A1 | 1/2017 |
| WO | WO 2017/014729 A1 | 1/2017 |
| WO | WO 2019/089497 A1 | 5/2019 |
| WO | WO 2019/147410 A1 | 8/2019 |

OTHER PUBLICATIONS

Examination Report in corresponding Chinese Patent Application No. 202180005629.3, in Chinese, dated Aug. 31, 2023 (10 pages).

3D PRINTER FOR ADDITIVE MANUFACTURING OF A COMPONENT AND PRINTING METHOD

CROSS-REFERENCE TO RELATED APPLICATIONS

This application is a divisional of U.S. application Ser. No. 17/761,884, filed Mar. 18, 2022, now allowed, which is a U.S. National Stage of International Application No. PCT/EP2021/051342, filed Jan. 21, 2021, which claims the benefit of Austrian Patent Application No. GM50014/2020, filed Jan. 29, 2020, both of which are incorporated herein by reference in their entireties.

FIELD OF THE INVENTION

The invention relates to a 3D printer for additive manufacturing of a multilayer component, a method for additive manufacturing of a three-dimensional multilayer component and a 3D-printed multilayer component.

BACKGROUND OF THE INVENTION

Printing apparatus for photopolymerization in a bath (cf. DIN EN ISO 17296) are characterized by placing a raw material in a bath or applying it to another work surface and then structuring and curing it in contact with a multilayer component. In some processes, the raw material is applied layer by layer to a work surface. Common methods for structuring and curing the raw material include stereolithography (SLA) or digital light processing (DLP). In these processes, the raw material is irradiated by usually programmable digital radiation sources. SLA processes usually use swivelling lasers for this purpose, while DLP processes use projectors, for example. The irradiation follows a predetermined pattern. The raw material, which is photosensitive in this case, then cures by photopolymerization of a binder it contains.

International patent application WO 2015/107066 A1 discloses a DLP 3D printer in which the raw material is applied to and transported by a conveyor belt to the work surface. Since usually only a part of the available raw material is consumed for structuring the new layer, more raw material has to be used than is necessary for manufacturing the component. The excess raw material used makes the printing process inefficient and expensive.

In international patent application WO 2017/009368 A1, another 3D printer with a conveyor belt is disclosed. Here, the raw material left over in the printing process is collected by means of a recovery device and can then be reused in the manufacturing process. In order to print with a second raw material, the entire printer comprising the recovery device must be cleaned to remove residues of the first raw material. Thus, printing a component comprising multiple layers of different materials is not possible in a single printing operation.

US application US 2017/0182708 A1 discloses a 3D printer with a laterally moving work surface. Since using multiple raw material dispensers, different raw materials can be applied here. The work surface and the component must be cleaned before each material change. Recovery of excess raw material is not provided in the disclosed apparatus.

SUMMARY OF THE INVENTION

A plurality of components are intended to include multiple layers comprising different materials. This is generally only possible with complex manufacturing processes in which the individual components are printed separately, for example, and then assembled. While the prior art includes initial approaches to printing multilayer devices comprising different materials, these are inefficient and expensive due to the excess raw material that must be used.

Thus, the objective of the invention is to disclose a 3D printer and a printing method according to which a multilayer component comprising different materials can be manufactured in a more efficient, resource-saving and cost-effective manner.

The invention according to claim 1 at least partially solves the described problem.

The present invention discloses a 3D printer for additively manufacturing a multilayer component.

The 3D printer includes at least two separate dispensers, each of which coats a conveyor belt with a different raw material. The dispensers may include a storage device in which the raw material is stored, and a coating device that deposits a layer of raw material onto the conveyor belt. The dispensers may include various technical embodiments. For example, the dispensers may be die coaters, syringe pumps, peristaltic pumps, ink jet heads, roller transfer apparatus, or transfer film. One embodiment including a die coater will be discussed in more detail in the examples.

The 3D printer further comprises a manufacturing unit in which at least part of the raw material is added to the component as a new layer. The manufacturing process here is an additive photopolymerization process. The first layer of the component can be added directly to a building plate provided for this purpose.

The 3D printer further comprises at least two separate recovery devices for selectively recovering the respective different raw material that is not consumed when a layer is added to the component. The recovered raw material is then returned to the respective associated dispenser. Each raw material is thus assigned, on the one hand, a dispenser which applies only this one raw material and, on the other hand, a recovery device which recovers only this one raw material and returns it to the associated dispenser.

In this way, it can be ensured that the different raw materials do not mix with each other either during the production process or during the recirculation. The excess raw material can therefore be recovered in consistent quality and reintroduced into the production process. A printer can thus print a component with multiple layers of different materials in a single printing operation in an efficient and resource-saving manner.

The printer further comprises the conveyor belt, which is used to transport the raw material in a lateral direction from the dispenser to the manufacturing unit and further to the recovery device. The conveyor makes it possible to decouple the location of material supply from the location of manufacturing and material recovery. Thus, the conveyor allows the printer to be set up in a flexible manner.

In one embodiment, the storage devices of the dispensers include a mixing device with which the returned raw material and possibly added new raw material are mixed to ensure a homogeneous composition of individual printed layers.

In one embodiment, the conveyor belt comprises a radiation permeable foil moved by rotating rollers. The radiation permeability of the conveyor belt allows the raw material to be cured by irradiation using a radiation source even through the conveyor belt. In one embodiment, the foil may be any polymeric foil that has high radiation permeability. Radiation is used here and hereinafter to include visible light, light in the infrared (IR) and ultraviolet (UV) ranges, X-rays, and all other forms of electromagnetic radiation.

Further, the conveyor belt can circulate and thus be re-coated after a full circulation is completed. For example when using a conveyor foil, circulating the conveyor belt eliminates the need to constantly feed new foil, so that the process can be carried out in a more resource-efficient and cost-effective manner.

The raw materials used during the printing process include pastes, which may include either a ceramic or a metallic or an organic powder and a photopolymerizable organic binder, i.e., polymerizable by radiation (photopolymerization). Such a raw material can be structured and cured by irradiation. For example, the radiation stimulates the photopolymerizable organic binder to polymerize, forming cured structures in the raw material.

Printing can be followed by a debinding process and a sintering process. These processes are performed to remove the organic binder and set a desired structure in the ceramic or metallic device.

In one embodiment, the manufacturing unit of the 3D printer comprises components for manufacturing the device according to a DLP process or an SLA process.

In this embodiment, the manufacturing unit comprises a work surface over which the conveyor belt is guided. The work surface comprises a window that is radiation permeable. Further, the manufacturing unit comprises a radiation source disposed below the window. Thus, the radiation source can pass through the window and the radiation permeable conveyor belt to expose and cure the raw material on the conveyor belt. The radiation source may be designed or programmed to irradiate and cure the raw material in a desired pattern. For example, the radiation source may be a laser (SLA process) or a projector (DLP process). It may be, for example, electromagnetic radiation in the visible, UV or IR range.

Furthermore, the manufacturing unit comprises a building plate, on the underside of which the component is manufactured and which adheres there, and which is arranged above the work surface parallel to the latter. A positioning system can raise and lower the building plate normal to the work surface, adjusting the distance between the previously printed layer of the component and the conveyor belt. The first layer is printed directly onto the building plate. The set distance then determines the thickness of the layer to be attached to the component.

Several components can also adhere to the building plate, to which new layers are added in parallel. All components in this embodiment must be above the work surface and within the area of the radiation permeable window.

In one embodiment, the manufacturing unit includes a cleaning device for cleaning excess raw material from the component. The cleaning device may include a drive system for moving the cleaning device laterally along the surface of the component.

The cleaning device may be, for example, a suction nozzle, a blade, or a roller. Preferably, the cleaning device is arranged to be positioned laterally adjacent the component when in a passive state and to move laterally across the surface of the component when in an active state.

A separate cleaning device may be provided for each raw material, such that the manufacturing unit comprises at least two cleaning devices.

Each cleaning device comprises a return device, wherein each return device comprises a conveying device which returns the recovered raw material to the respective associated dispenser. For example, the conveying device is a pump and the return device is a hose. The separate return devices ensure that the raw material is not mixed and thus can be reused.

In one embodiment, the return device may be identical to the cleaning device. For example, a roller may be used that has an adherent surface and removes any remaining raw material by running over the component surface thereon. The roller can then be moved by a positioning system to the dispenser, where the raw material is removed from the roller and filled into the dispenser. Such a device is called a roller transfer apparatus.

A similar operation can be performed using an adherent surface of a transfer film. If the cleaning device is a suction nozzle, the return device can be designed as a hose, which contains, for example, a pump or a blower as a conveying device. If the cleaning device is designed as a blade which scrapes over the surface of the component, the return device may be a trough located under the component which can be moved to the dispenser by means of a positioning system.

The invention further discloses a method for additively manufacturing a three-dimensional multilayer component and recovering unused raw material, comprising the steps of:

Applying a layer of a raw material to a conveyor belt by means of a dispenser, wherein the applied layer thickness of raw material is at least equal to the desired layer thickness of a layer to be added to the component.

Usually, an excess of raw material is required to produce an intact layer with the desired dimensions.

Transport of the conveyor belt with the layer of raw material to a work surface.

The conveyor belt makes it possible to decouple the place of application of the raw material and the place of manufacture, thus making the process more flexible.

Bringing the layer of raw material into contact with a surface of the component to be coated on the work surface and structurally curing a portion of the raw material to form a new structured layer of the component.

The first layer of the component is fabricated in contact with the surface of a building plate provided therefor.

Lifting of the component comprising the new layer from the work surface.

Lifting separates the hardened component from unhardened raw material. It is possible that some of the excess raw material will stick to the component.

Transporting the remaining raw material on the conveyor to a recovery device.

The recovery device may be, for example, a suction nozzle, blade, or roller, and may further include a device for returning the raw material to the dispenser.

Removing the remaining raw material from the conveyor belt using the recovery device and returning the raw material to a dispenser.

The device for returning may be, for example, a hose or tube system. This may include a conveying device, such as a pump or blower.

If the recovery device is a roller, it may be designed as a transfer roller. The transfer roll picks up raw material via its adherent surface, can then be moved to the dispenser, and there releases the raw material back to the corresponding dispenser.

Repeating the aforementioned process steps with a second raw material and a second dispenser, wherein a second recovery device is provided so that the first and second raw material can each be selectively returned to the corresponding dispenser.

In a further embodiment of the method, the aforementioned method steps are repeated with a third or further raw materials and a third or further dispenser, as well as third or further recovery devices. The third raw material is selectively recycled into the corresponding dispenser. The further raw materials are also each selectively recycled into the respective further dispensers. No mixing of the raw materials takes place, so that they can be used again in the printing process.

In one embodiment of the method, the work surface has a window that is radiation permeable. In its dimension, the window has at least the dimensions of the layer to be added. A building plate with the component is positioned over the window. The building plate is lowered normal to the window until the distance between the surface of the component and the top of the conveyor belt corresponds to the desired layer thickness of the new structured layer to be added to the component. When printing the first layer of the component, the building plate is lowered so that the distance between the surface of the building plate and the conveyor belt is equal to the desired thickness of the first layer.

In this process, the raw material is structured and cured by irradiating the multilayer component through the window to form a new layer. For this purpose, the raw material comprises a binder that has photosensitive properties. The irradiation causes photopolymerization of the binder.

In the process, the building plate with the component and the new layer adhering to it is also lifted off the conveyor belt. For this purpose, the adhesion between the component and the building plate should be greater than the adhesion between the component and the conveyor belt. This greater adhesion of the component to the building plate is ensured by selecting the material of the building plate and by a high surface roughness of the building plate compared to the foil of the conveyor belt. High roughness facilitates adhesion of the component to the building plate. When selecting the building plate material, it is preferred to select a material with similar properties to the material of the component or a roughened metal plate.

In one method, the following subsequent steps are carried out:
  Providing a cleaning device for cleaning the component from raw material.
  In this case, the cleaning device is preferably positioned laterally next to the component.
  Removing the excess raw material from the surface of the component by moving the cleaning device laterally along the surface of the component.
  The cleaning device can be, for example, a suction nozzle, a blade or a roller.
  Returning the raw material to the dispenser corresponding to the raw material by an associated return device.
  In the case of the suction nozzle, the return device may be, for example, a hose system or a pipe system. In the case of the roller, it may be a transfer roller. Each raw material is assigned a corresponding cleaning device with a corresponding return device, so that the raw materials are not mixed.

The invention further comprises a component comprising a plurality of layers which are
  are separated from each other along a planar surface,
  comprise different materials,
  are chemically bonded directly to each other, and The invention further comprises a component having the aforementioned properties, the layers of which each have a thickness of 300 μm or less. Preferably, a component has layer thicknesses between 5 μm and 200 μm.

The layers may be arranged both laterally and vertically adjacent to each other. The delimiting surfaces between different layers may be parallel to the outer surfaces of the component. The materials of the component may include various metals, ceramics, and plastics, or any of these. No additional bonding agents, such as adhesives, are provided between layers. The layer thicknesses can be variably adjusted in the printing process, so that flexible structuring of the component is possible.

In one embodiment, the component is present in a first structure after printing and comprises a binder. In the case of pure plastic components, this first structure is the desired component structure. In the case of metal or ceramic components, a sintering step can remove the binder and change the structure of the component. After sintering, the component is in a desired second structure.

The invention is explained in more detail below in embodiment examples with reference to drawings. However, the invention is not limited to the forms and examples described or illustrated. The scope of protection is based only on the features disclosed in the claims.

Figure 1:
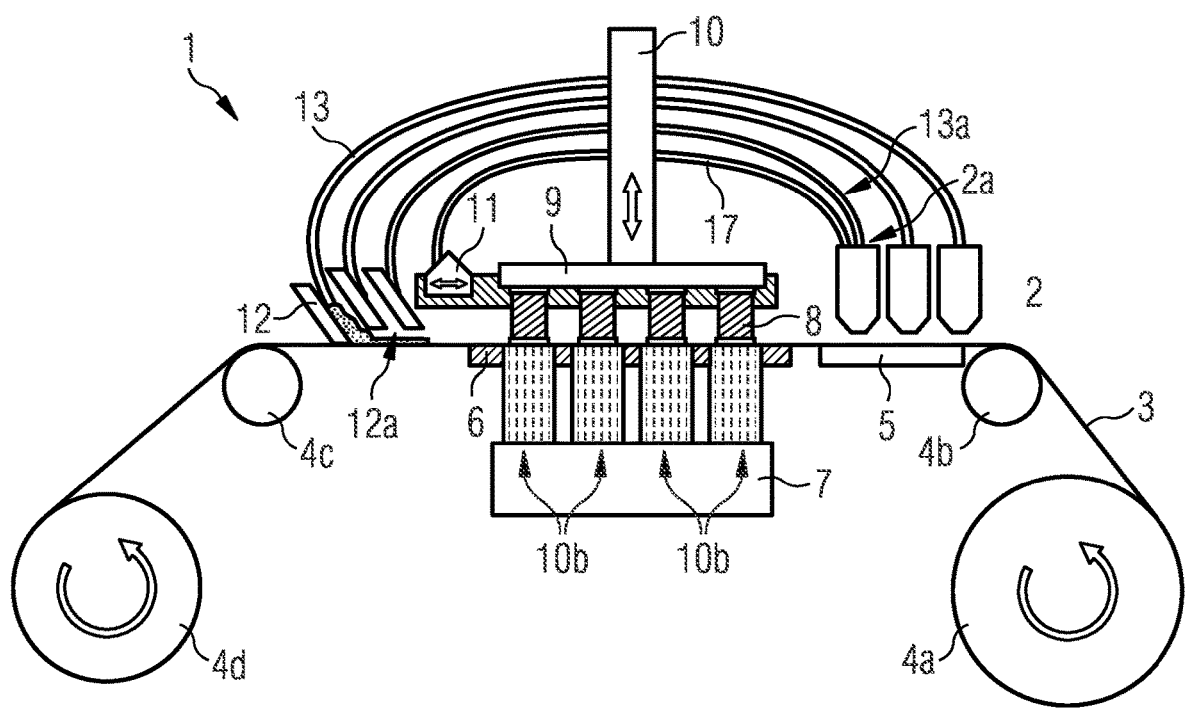
FIG. 1: Schematic representation of a first embodiment of the 3D printer. Shown is the manufacturing step.

The figures are schematic representations. The figures do not represent true-to-scale images of the 3D printer. Dimensions and proportions may differ from those shown in the drawings.

DETAILED DESCRIPTION OF THE DRAWINGS

FIG. 1 shows a first embodiment example of the 3D printer 1. The 3D printer 1 comprises three separate dispensers 2 arranged side by side. The dispensers 2 are arranged above a conveyor belt 3 and are each configured to apply different raw materials to the conveyor belt. The dispensers 2 are designed here as die coaters.

The conveyor belt 3 comprises a foil guided over a plurality of rollers 4. The foil is made of a polymer such as polyethylene terephthalate (PET). In the present example, the four rollers 4 shown rotate counterclockwise at the same speed, thus moving the conveyor belt 3. Prior to printing, the foil is rolled up on the roller 4a shown on the far right and is unwound from it during the process before being deflected in a desired direction by a first deflection roller 4b and passing through the 3D printer 1.

After passing through the 3D printer 1, the foil is deflected by a second deflection roller 4c in the direction of a roller 4d shown on the far left in FIG. 1, where it is rolled up again. It is possible to return the foil for recycling if the left and right rollers, 4a and 4d are changed after the process.

To support the foil, a carrier plate 5 is placed under the foil at the point of raw material application, on the side opposite to the dispensers 2. The carrier plate 5 and the foil are not connected to each other. The foil lies loosely on the carrier plate 5. The conveyor belt is used to transport the raw material applied by the dispensers to a work surface 6 arranged laterally next to the carrier plate 5. The foil also lies loosely on the work surface 6.

The work surface 6 includes a radiation permeable window which occupies most of the surface area. A projector 7 is arranged below the window, which irradiates the raw material between the foil and the components 8, which is to be added to the components 8 as a new layer, in a predetermined pattern, thereby structuring and hardening it. Exemplary light beams 10b are shown in the figure. The pattern may be defined, for example, in the form of a mask applied to the projector 7. Alternatively, the pattern may be digitally pre-programmed, for example.

The pattern may be such that the new layer covers only an area of the underside of the previous component 8 after printing on the component. Thus, in a later printing process, another layer can also be printed laterally next to an existing layer.

Several components 8 are attached to a building plate 9. The number of possible attached components 8 depends on the geometry of the components 8 and the building plate 9. In the present example, four components 8 are attached to the building plate 9. The building plate 9 includes an underside with high surface roughness to which the components 8 adhere well. The building plate 9 is arranged parallel to the work surface 6 above it. By means of a positioning system 10, the building plate 9 with the components 8 can be raised and lowered normal to the work surface 6. For this purpose, the positioning system 10 is positioned centrally above the work surface 6 and vertically with respect thereto.

Furthermore, the 3D printer 1 comprises a cleaning device 11 that can be moved along the undersides of the components 8 by means of a drive system. Said drive system is therefore positioned parallel to the building plate 9 at a sufficiently large distance above the work surface 6 and in front of or behind the positioning system 10. In this case, the cleaning device 11 is designed as a blade that can scrape unused raw material from the components 8.

Furthermore, in the first embodiment, the 3D printer 1 comprises three recovery devices 12. The recovery devices 12 are designed as blades that scrape the excess raw material from the moving conveyor belt 3. A separate recovery device 12 is provided for each raw material. The recovery devices 12 are located over a portion of the conveyor belt 3 that is laterally adjacent to the work surface 6, but on a different side than the carrier plate 5.

Further, the recovery devices 12 each comprise a hose 13, for returning the raw material to the associated dispensers 2. A pump is provided in the hose 13, which sucks the raw material from the recovery device 12 and delivers it through the hose 13. The hoses 13 connect the recovery devices 12 to the respective associated dispensers 2.

An exemplary method is illustrated in FIGS. 2A, 2B, 2C, 2D, 2E and 2F with reference to the first embodiment. In a first step A, a first dispenser 2a applies a first raw material to the conveyor belt 3. The conveyor belt 3 transports the raw material onto the work surface 6.

Subsequently, in a step B, the positioning system 10 lowers the building plate 9 to such an extent that the building plate comes into contact with the raw material applied to the conveyor belt and the distance between the building plate 9 and the conveyor belt 3 corresponds to the desired thickness of the new layer. Excess raw material is displaced here to the edges of the building plate 9 as the first layer is printed.

Then, in step C, the raw material under the building plate 9 is irradiated by a projector 7 according to a desired pattern or structure. Incident radiation hardens the material by photopolymerizing the organic binder and forms a first layer of components 8 that adheres to the building plate 9. The building plate 9 can now be lifted using the positioning system 10, leaving the majority of the remaining uncured raw material on the conveyor belt 3.

The remaining raw material left on the conveyor belt 3 and not transferred to the building plate or component is further transported by it in step D and removed from the conveyor belt 3 by a first recovery device 12a, which is designed as a blade. The hose 13a then conveys the raw material back to the first dispenser 2a driven by a pump integrated in the hose 13a.

Parallel to the recovery, new raw material can already be applied to the conveyor belt 3, analogous to step A. This can be the same dispenser as in step A, applying the same raw material, or a different dispenser applying a different raw material. The conveyor then simultaneously transports old, unused raw material away from the work surface 6 to the first recovery device 12a and new raw material from one of the dispensers 2 to the work surface 6.

In parallel, in step E, after lifting the building plate 9 with the components 8 adhered thereto, the underside of the newly printed layer is cleaned by running the surface of the component 8 with the cleaning device 11.

The raw material from the cleaning device 11 is also returned to the associated first dispenser 2a by use of a return device 17 (FIG. 1).

Once the first layer has been printed and cleaned and the first raw material has been completely removed from the conveyor belt 3, a second and then further layers can be applied to the component 8 by repeating the aforementioned process steps with a different hardened structure, if necessary. If a different raw material is provided for the second or a further layer, the first dispenser 2a and the first recovery device 12a are raised and instead a second or alternatively a third dispenser and a second or correspondingly third recovery device are lowered to the conveyor belt 3 and the entire process is repeated with a further raw material.

Since at least one layer of the component 8 is then already adhering to the building plate 9, in a step F corresponding to step B, the component 8 is lowered to such an extent that the distance between component 8 and conveyor belt 3 corresponds to the thickness of a desired new layer. Excess raw material is now displaced to the edges of the existing layers of component 8.

Figure 2A:
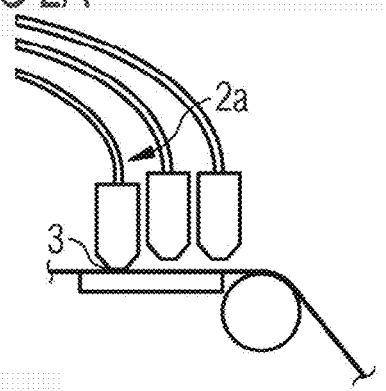
FIG. 2A: Schematic illustration of a printing process using the first embodiment of the 3D printer.
Figure 2B:
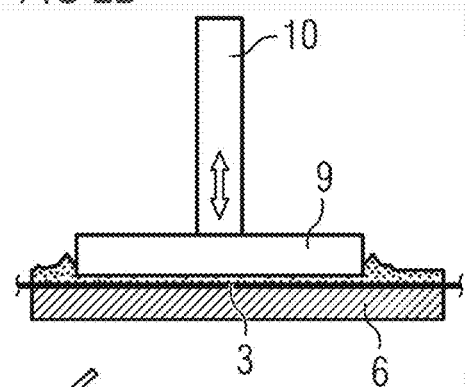
FIG. 2B: Schematic illustration of the printing process subsequent to FIG. 2A in which the positioning system lowers the building plate to come into contact with the raw material.
Figure 2C:
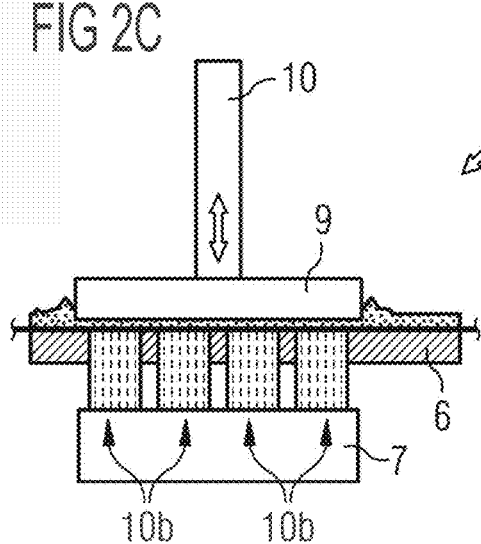
FIG. 2C: Schematic illustration of the printing process subsequent to FIG. 2B in which the raw material under the building plate is irradiated by a projector.
Figure 2D:
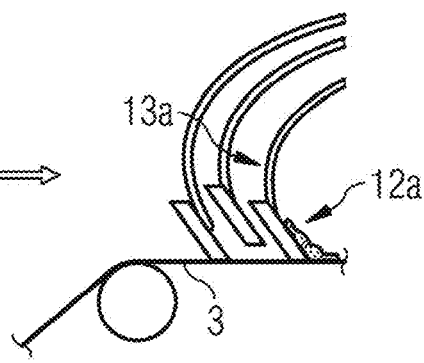
FIG. 2D: Schematic illustration of the printing process subsequent to FIG. 2C in which the remaining raw material left on the conveyor belt is removed by a first recovery device.
Figure 2E:
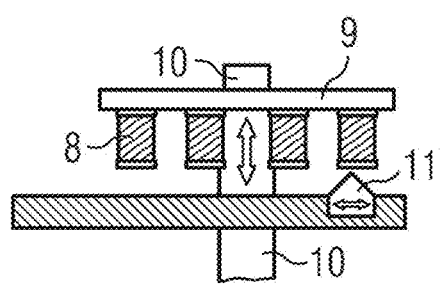
FIG. 2E: Schematic illustration of the printing process of FIGS. 2A-2D in which the building plate is lifted with the component adhered thereto, and the underside of the newly printed layer is cleaned with a cleaning device.
Figure 2F:
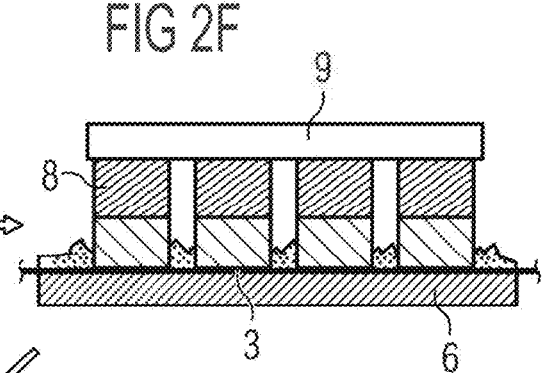
FIG. 2F: Schematic illustration of the printing process of FIGS. 2A-2E in which a second raw material is added to the component.

The first raw material is, for example, a ceramic raw material containing an organic binder. The second raw material, shown hatched in FIG. 2F, is for example a polymer paste which also contains the organic binder. Further layers may again contain the same or further different raw materials. Each layer can be applied with a different structure or as a different pattern, so that the production of a component with any external spatial shape and any internal structure can be generated.

Figure 3:
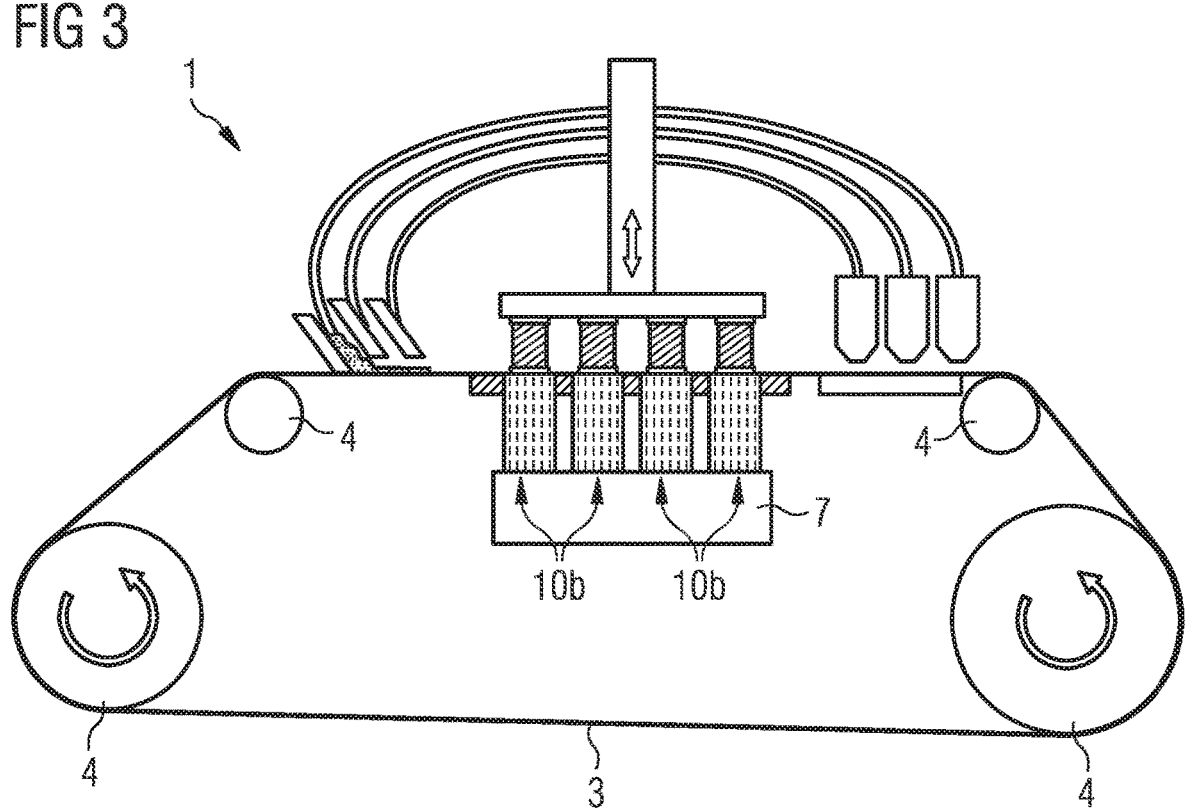
FIG. 3: Schematic illustration of a second embodiment of the 3D printer in which the foil is circulated.

FIG. 3 shows a second embodiment of the 3D printer 1, which is substantially the same as the first embodiment. However, unlike the first embodiment, in the second embodiment the conveyor belt 3 is circulated so that the foil used for the conveyor belt 3 can be reused in a circulating manner without interruption or intervention in the process. For this purpose, the conveyor belt 3 is guided over four rollers 4 which, in the present example, rotate counterclockwise at a suitable speed. The rollers may also rotate clockwise in other embodiment examples. The arrangement of the rollers 4 corresponds to the arrangement of the four rollers of the first embodiment example. In contrast, all rollers now serve as deflection rollers. The foil is not unwound or wound on any roller.

In a preferred embodiment, a cleaning device is provided along the circulated conveyor belt 3 downstream of the recovery device, which removes the last remnants of raw material from the conveyor belt 3, so that it is ensured that there is no mixing of the various raw materials.

Figure 4:
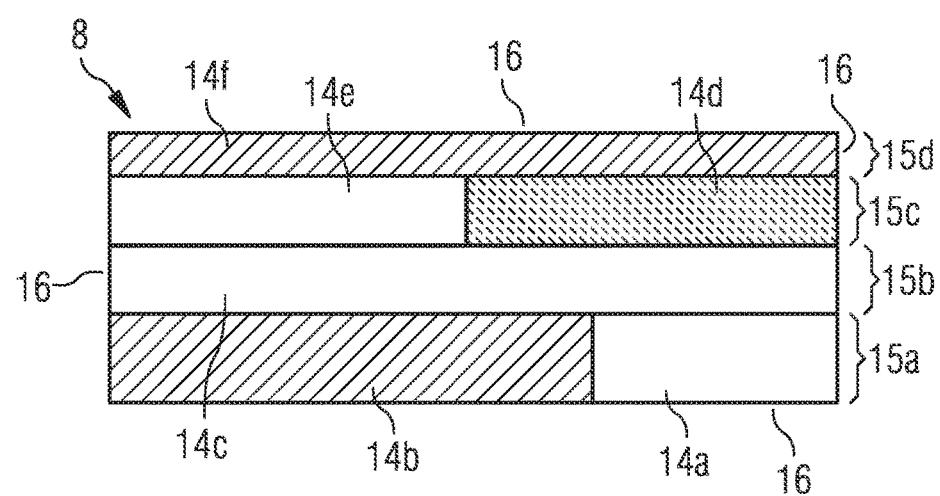
FIG. 4: Schematic representation of a printed multilayer component.

FIG. 4 shows schematically an example of a printed, multilayer component 8. Here, the component comprises six layers 14a to 14f in four vertically stacked levels 15a to 15d. The first and third layers (15a, 15c) from the bottom each comprise two layers (14a, 14b, 14d, 14e). The top layer 14f corresponds to the layer produced first in the printing process. The lowest layers 14a and 14b were manufactured last in the printing process.

The component 8 comprises layers of three different materials, which are represented by different hatchings. One of the three materials is a metal, the others are two different polymers or ceramics.

The boundary between each of the layers is along a planar interface parallel to the outer sides 16 of the component 8. The individual layers may fully encompass a horizontal plane of the component 8, as in the second and fourth layers (14c, 14f) from the bottom in the present component 8, but the layers may also be laterally adjacent to each other as in the first and third planes (15a, 15c) of the component 8.

The layer thicknesses of the component 8 may vary. The uppermost layer 14f in the depicted component 8 is thinner, and the lowermost two layers 14a and 14b are thicker than the other layers of the component 8.

No further intermediate layers or bonding layers, such as adhesive layers, exist between the layers described.

REFERENCE SYMBOLS 1 3D printer
2 dispenser
2a first dispenser
3 conveyor belt
4 rollers of conveyor belt 3
4a right roller
4b first deflection roller
4c second deflection roller
4d left roller
5 carrier plate
6 work surface
7 projector
8 component
9 building plate
10 positioning system
10b light beam
11 cleaning device
12 recovery device
12a first recovery device
13 hose
13a first hose
14a-14f layers of component 8
15a-15d layers of component 8
16 outer surface of component 8

The invention claimed is:

1. A method for additively manufacturing a three-dimensional, multilayer component, comprising:
    applying a layer of a first raw material to a conveyor belt by use of a first dispenser, wherein a thickness of the applied layer of the first raw material corresponds at least to the desired layer thickness of a layer to be added to the component;
    transporting the conveyor belt with the layer of the first raw material onto a work surface:
    bringing the layer of the first raw material on the work surface into contact with a surface of the component to be coated, and structurally hardening a portion of the first raw material to form a new structured layer of the component;
    lifting the component having the new structured layer off the work surface;
    transporting the remaining first raw material on the conveyor belt to a first recovery device;
    removing the remaining first raw material from the conveyor belt by use of the first recovery device, and returning the remaining first raw material to the first dispenser,
    repeating the aforementioned process steps with a second raw material, a second dispenser, and a second recovery device, wherein the second recovery device is provided so that the first raw material and the second raw material can be selectively returned, respectively, to the corresponding first dispenser and corresponding second dispenser.

2. The method according to claim 1, wherein
    the work surface has a window which is radiation permeable and wherein the window has at least the dimensions of the layer to be added,
    a building plate with the component is positioned above the window,
    the building plate is lowered normal to the window until the distance between the surface of the component and the upper side of the conveyor belt corresponds to the desired layer thickness of the new structured layer to be added to the component,
    the first raw material is structured and hardened by irradiation of the multilayer component through the window to form the new structured layer, and
    the building plate with the component and the new structured layer adhering thereto is lifted off the conveyor belt.

3. The method according to claim 2, further comprising:
    providing a cleaning device for cleaning the component from excess first raw material,
    removing the excess first raw material from the surface of the component by laterally moving the cleaning device along the surface of the component,
    returning the excess first raw material to the first dispenser corresponding to the first raw material by an associated return device.

4. The method according to claim 2, wherein the first recovery device and the second recovery device remove the remaining first and second raw materials from above the conveyer belt.

5. The method according to claim 4, wherein the first recovery device is laterally adjacent to the work surface such that the transporting of the remaining first raw material on the conveyor belt moves the remaining first raw material away from the work surface.

6. The method according to claim 2, wherein the first recovery device is laterally adjacent to the work surface such that the transporting of the remaining first raw material on the conveyor belt moves the remaining first raw material away from the work surface.

7. The method according to claim 2, further including (i) cleaning the component to remove excess first raw material from the component and conveying the excess first raw material to the first dispenser, and (ii) cleaning the component to remove excess second raw material from the component and conveying the excess second raw material to the second dispenser.

8. A method for additively manufacturing a three-dimensional, multilayer component, comprising:
    applying a first layer of a first raw material to a conveyor belt by use of a first dispenser;
    transporting the conveyor belt with the first layer of the first raw material to a work surface;
    contacting the first layer of the first raw material with a surface of the component to be coated to form a new structured layer of the component;
    transporting the remaining first raw material on the conveyor belt to a first recovery device;
    by use of the first recovery device, selectively removing the remaining first raw material from the conveyor belt and returning the remaining first raw material to the first dispenser;
    applying a second layer of a second raw material to the conveyor belt by use of a second dispenser;
    transporting the conveyor belt with the second layer of the second raw material to the work surface;
    contacting the second layer of the second raw material with the component to form a second new structured layer of the component;
    transporting the remaining second raw material on the conveyor belt to a second recovery device; and
    by use of the second recovery device, selectively removing the remaining second raw material from the conveyor belt and returning the remaining second raw material to the second dispenser.

9. The method according to claim 8, wherein the selective removing of the remaining first raw material is from above the conveyer belt, and the selective removing of the remaining second raw material is from above the conveyer belt.

10. The method according to claim 9, wherein the first recovery device is laterally adjacent to the work surface such that the transporting of the remaining first raw material on the conveyor belt moves the remaining first raw material away from the work surface.

11. The method according to claim 8, wherein the first recovery device is laterally adjacent to the work surface such that the transporting of the remaining first raw material on the conveyor belt moves the remaining first raw material away from the work surface.

12. The method according to claim 8, further including (i) cleaning the component to remove excess first raw material from the component and conveying the excess first raw material to the first dispenser, and (ii) cleaning the component to remove excess second raw material from the component and conveying the excess second raw material to the second dispenser.

13. The method according to claim 8, further including curing the first raw material and the second raw material on the component by use of energy transferred through the conveyer belt.

* * * * *